United States Patent [19]

Tomoda et al.

[11] 4,251,399

[45] Feb. 17, 1981

[54] CO-CROSSLINKABLE BLEND COMPOSITION COMPRISING IODINE-CONTAINING FLUOROELASTOMER

[75] Inventors: Masayasu Tomoda, Otsu; Yutaka Ueta, Toyonaka, both of Japan

[73] Assignee: Daikin Kogyo Co., Ltd., Osaka, Japan

[21] Appl. No.: 82,274

[22] Filed: Oct. 5, 1979

[30] Foreign Application Priority Data

Oct. 7, 1978 [JP] Japan ................... 53-123860

[51] Int. Cl.$^3$ ............... C08L 7/00; C08L 27/16; C08L 27/22; C08L 9/00
[52] U.S. Cl. .................. 260/4 R; 525/102; 525/104; 525/126; 525/129; 525/187; 525/193; 525/194; 525/196; 525/199; 525/200

[58] Field of Search ............ 525/193, 194, 196, 199, 525/200, 102, 104, 129, 187, 126; 260/5, 4 R

[56] References Cited

U.S. PATENT DOCUMENTS

| | | | |
|---|---|---|---|
| 3,519,703 | 7/1970 | Merkl et al. | 525/199 |
| 3,864,433 | 2/1975 | Tatsukami et al. | 525/200 |
| 3,987,126 | 10/1976 | Brodoway | 525/200 |
| 4,158,678 | 6/1979 | Tatemoto et al. | 260/884 |

*Primary Examiner*—Carman J. Seccuro
*Attorney, Agent, or Firm*—Birch, Stewart, Kolasch & Birch

[57] ABSTRACT

A co-crosslinkable blend composition which comprises an iodine-containing fluoroelastomer, an elastomer crosslinkable in the presence of a peroxy radical and an organic peroxide.

7 Claims, No Drawings

CO-CROSSLINKABLE BLEND COMPOSITION COMPRISING IODINE-CONTAINING FLUOROELASTOMER

The present invention relates to a co-crosslinkable blend composition. More particularly, it relates to a co-crosslinkable blend composition comprising an iodine-containing fluoroelastomer.

Fluoroelastomers are excellent in various physical and chemical properties such as thermal resistance, oil-resistance, chemical resistance, solvent-resistance and oxidation-resistance and thus are useful as industrial materials to be employed in a variety of fields. Unfortunately, however, their production costs are relatively high. In addition, they are inferior in elasticity at low temperatures. In order to overcome these drawbacks, attempts have been made to blend other elastomers into fluoroelastomers. However, the resulting blend compositions are not satisfactory in being not readily crosslinkable with organic peroxides and/or having difficult processability due to improper viscosity or hardness.

As the result of an extensive study, it has now been found that a blend composition comprising an iodine-containing fluoroelastomer and an elastomer can be readily co-crosslinked with an organic peroxide. Advantageously, the blend composition is easily provided with appropriate viscosity or hardness so that it can be processed with ease.

It is known that conventional fluoroelastomers are crosslinkable with organic peroxides. Due to their inferior crosslinkability, however, practical use has not been made. It is also known that conventional hydrocarbon elastomers are crosslinkable with organic peroxides. Disadvantageously, however, the backbone chains of those hydrocarbon elastomers are cut off upon vulcanization. Quite surprisingly, the iodine-containing fluoroelastomer used in this invention shows an excellent crosslinkability with an organic peroxide. Further, the iodine-containing fluoroelastomer and a conventional hydrocarbon elastomer are well co-crosslinked with an organic peroxide without cleavage of the backbone chain in the hydrocarbon elastomer. Furthermore, the choice of a suitable hydrocarbon elastomer can impart appropriate viscosity or hardness to the resulting blend composition, which is thus processable with ease. Since the production cost of hydrocarbon elastomers is considerably lower than that of fluoroelastomers, the incorporation of a hydrocarbon elastomer into the iodine-containing fluoroelastomer can provide a blend composition having advantageous characteristic properties inherent to fluoroelastomers at low costs.

According to the present invention, there is provided a co-crosslinkable blend composition comprising (1) an iodine-containing fluoroelastomer, (2) a hydrocarbon elastomer crosslinkable in the presence of a peroxy radical and (3) an organic peroxide.

The iodine-containing fluoroelastomer is a fluoroelastomer which contains iodine in an amount of 0.001 to 10% by weight, preferably 0.01 to 5% by weight. When the iodine content is smaller than 0.001%, the crosslinkability of the polymer is insufficient. When larger than 10%, the thermal resistance is deteriorated. For instance, a fluoroelastomer comprising units of vinylidene fluoride and of at least one other fluoroolefin copolymerizable therewith and having iodine atoms bonded thereto in the said range is usable. The iodine-containing fluoroelastomer can be prepared, for instance, by copolymerization of vinylidene fluoride with at least one other fluoroolefin in the presence of a radical-generating source and an iodinated compound of the formula:

$$RfI_x$$

wherein Rf is a saturated or unsaturated fluorohydrocarbon or chlorofluorohydrocarbon group and x represents the bonding number of Rf, which is at least 1, preferably 1 or 2 (cf. U.S. Pat. No. 4,158,678; U.S. Ser. No. 894,256, filed Apr. 7, 1978). As the other fluoroolefins, there may be exemplified tetrafluoroethylene, chlorotrifluoroethylene, trifluoroethylene, vinyl fluoride, hexafluoropropylene, pentafluoropropylene, perfluoro(methyl vinyl ether), perfluoro(ethyl vinyl ether), perfluoro(propyl vinyl ether), etc.

As the hydrocarbon elastomer, there may be employed any one which is substantially crosslinkable in the presence of a peroxy radical. Thus, elastomers containing in the molecular chain —CH$_2$— units or unsaturated groups, polymers containing crosslinkable portions being active to peroxy radical, etc. are usable. Specific examples are natural rubbers (NR), synthetic natural rubbers (IR), ethylene-propylene rubber (EPM), ethylene-propylene diene monomer rubber (EPDM), butadiene-styrene rubber (SBR), butadiene rubber (BR), halogenated butyl rubber (butyl rubber halogenated with a small amount of chlorine or bromine), chloroprene rubber (CR), isobutylene-isoprene rubber (IIR), butadiene-acrylonitrile rubber (NBR), chlorosulfonated polyethylene rubber (CSM), acryl rubber (ACM, ANM), epichlorohydrin rubber (CHR), epichlorohydrin-ethylene oxide rubber (CHC), urethane rubber (AU, EU), etc. These hydrocarbon rubbers are described in ASTM (American Society for Testing and Materials) D1418-72a, Encyclopedia of Polymer Science and Technology, 5, 406–482 (1966), etc. Other low molecular weight polymers having various compositions are also usable. Examples of these polymers are tetrafluoroethylene-propylene rubber containing crosslinkable portions (incorporated or not with any third component), hexafluoroethylene-ethylene rubber (incorporated or not with any third component), silicone rubber, fluorosilicone rubber, phosphonitrilic rubber, etc. The amount of the hydrocarbon elastomer to be used is not particularly limited. In the usual case, 5 to 100 parts by weight, preferably 5 to 50 parts by weight, of the hydrocarbon elastomer is employed to 100 parts by weight of the iodine-containing fluoroelastomer.

As the organic peroxide, there may be usually employed one which produces a peroxy radical readily under heating or in an oxidation-reduction system. Specific examples are 1,1-bis(t'-butylperoxy)-3,5,5-trimethylcyclohexane, 2,5-dimethylhexane-2,5-dihydroxyperoxide, di-t-butyl peroxide, t-butylcumyl peroxide, dicumyl peroxide, α,α'-bis(t-butyl peroxy)-p-diisopropylbenzene (hereinafter referred to as "Peroxymon F-40"), 2,5-dimethyl-2,5-di(t-butylperoxy)hexane, 2,5-dimethyl-2,5-di(t-butylperoxy)hexyne-3, benzoyl peroxide, t-butyl peroxybenzene, 2,5-dimethyl-2,5-di(benzoyl peroxy)hexane, t-butylperoxy maleic acid, t-butyl peroxy isopropyl carbonate, etc. Among them, dialkyl type compounds are particularly preferable. The kind and amount of the organic peroxide may be usually decided according to the amount of the active —O—O— group, the decomposing temperature, etc. In the usual case, 0.05 to 10 parts by weight, preferably 1.0 to 5 parts by weight, of the peroxide is employed to 100 parts by weight of the combined amount of the iodine-containing fluoroelastomer and the hydrocarbon elastomer.

In addition to the above three essential components, the blend composition of the invention may comprise any crosslinking coagent or co-crosslinking agent. As the crosslinking coagent or co-crosslinking agent, there may be employed any one which shows a reactivity to both peroxy radicals and polymeric radicals. Particularly preferred are diallyl phthalate, triallyl cyanurate, triallyl isocyanurate, triacrylformal, triallyl trimellitate, N,N'-m-phenylenebismaleimide, dipropargyl terephthalate, divinylbenzene, divinylspirodioxane, tetrallyloxyethane, tetraallyl terephthalamide, divinylsilane, etc. The amount to be used is usually from 0.1 to 10 parts by weight, preferably 0.5 to 5 parts by weight, to 100 parts by weight of the combined amount of the iodine-containing fluoroelastomer and the hydrocarbon elastomer.

The crosslinking of the blend composition of the invention may be preferably carried out in the presence of a divalent metal oxide or hydroxide as the acid-accepting agent. As the divalent metal oxide or hydroxide, there may be exemplified oxides or hydroxides of Ca, Mg, Pb, Zn, etc. and their complex salts. The role of these compounds is not only to serve as the acid-acceptor but also to contribute to an improvement of the crosslinkability, the mechanical properties and the thermal resistance of the blend.

In some cases, it may be preferable to use an antioxidant, because the hydrocarbon elastomer, especially the one containing unsaturated groups, is susceptible to oxidation simultaneously with crosslinking. But, excessive use thereof should be avoided, because an unfavorable influence on the crosslinkability may be produced. As the antioxidant, there may be employed the compounds containing in the molecular chain —NH—, —NH$_2$, —OH and/or —SH. There may be also employed other conventional additives such as carbon black, a processing agent and a plasticizer.

The blend composition of the invention may be subjected to crosslinking by a per se conventional procedure. The composition shows an excellent roll-processability, and the co-crosslinked product has high resistance to fuel oil. Thus, it may be used advantageously as parts of fuel oil systems in aeroplanes, motorcars, ships, etc.

Another advantageous use of the blend composition is that, by applying it between a fluoroelastomer composition layer and a hydrocarbon elastomer composition layer which do not adhere to each other even by piling under pressure, adhesion of the two layers becomes possible, and the preparation of various kinds of laminated products which has been difficult with conventional fluoroelastomers can be readily achieved owing to the facility of adhesion.

The present invention will be hereinafter explained further in detail by the following Examples as well as Reference Examples and Comparative Examples.

REFERENCE EXAMPLE 1

In a 3000 ml (inner volume) pressure reaction tank, deionized water (1500 ml) and ammonium perfluorooctanoate (7.5 g) were charged, and the air in the tank was replaced by a gaseous mixture of vinylidene fluoride and hexafluoropropylene (hereinafter referred to as "VdF" and "HFP," respectively) (molar ratio, 45:55). Then, the pressure was elevated up to 14 kg/cm$^2$G, and a solution of ammonium persulfate (hereinafter referred to as "APS") (5 mg) in deionized water was charged therein under pressure. The contents were stirred at 80° C. so as to effect polymerization until the pressure was reduced from 14 kg/cm$^2$G to 13 kg/cm$^2$G. Immediately thereafter, I(CF$_2$CF$_2$)$_2$I (0.5 ml) (25° C.) was introduced into the reaction system, and then a solution of APS (20 mg) in deionized water (10 ml) was added under pressure, whereby the polymerization was immediately initiated to lower the pressure. When the pressure was reduced to 13 kg/cm$^2$G, a gaseous mixture of VdF and HFP (molar ratio, 78:22) was introduced to elevate the pressure up to 15 kg/cm$^2$G. The polymerization was continued while regulating the pressure in a range of 13 to 15 kg/cm$^2$G by the above mentioned procedure. After 22 hours, the temperature and the pressure were rapidly lowered to stop the polymerization.

After 7 and 14 hours from the initiation of the polymerization, a solution of APS (20 mg) in deionized water (10 ml) was added under pressure, whereby the polymerization velocity was increased only a little, and an almost constant polymerization rate was maintained during the reaction. The solids content in the produced dispersion was 20% by weight. This dispersion was coagulated with a 1% aqueous solution of potash alum, washed with water and dried to obtain a rubber-like polymer. The intrinsic viscosity [$\eta$] of this polymer in methyl ethyl ketone was 0.68. The Mooney viscosity (ML$_{1+20}$ (140° C.)) was 32. The iodine content in the polymer was 0.18% by weight.

REFERENCE EXAMPLE 2

In a 3000 ml (inner volume) pressure reaction tank, deionized water (1500 ml) and ammonium perfluorooctanoate (7.5 g) were charged, and the air in the tank was replaced by a gaseous mixture of VdF and HFP (molar ratio, 45:55). Then, the pressure was elevated up to 14 kg/cm$^2$G, and I(CF$_2$CF$_2$)$_2$I (0.3 ml) (25° C.) was introduced therein. The temperature was elevated up to 80° C. under stirring, and a 0.2% aqueous solution (10 ml) of APS was added under pressure. After the induction time of about 0.5 hour, reduction of pressure took place. When the pressure was lowered to 15 kg/cm$^2$G, a gaseous mixture of VdF and HFP (molar ratio, 78:22) was introduced to elevate the pressure up to 15 kg/cm$^2$G. In this manner, the pressure was regulated in a range of 13 to 15 kg/cm$^2$G during the polymerization. After 20 hours, the temperature and the pressure were rapidly lowered to stop the polymerization. The solids content in the produced dispersion was about 25% by weight. The dispersion was then coagulated with a 1% aqueous solution of potash alum, washed with water and dried to obtain a rubber. The iodine content in this rubber was 0.13% by weight. The intrinsic viscosity [$\eta$] in methyl ethyl ketone was 0.84, and the Mooney viscosity (ML$_{1+20}$ (140° C.)) was 43.

EXAMPLES 1 to 8 and Comparative Examples 1 to 4

The materials shown in Table 1 were blended by a roll to prepare a blend composition, which was then subjected to press-vulcanization. The physical properties of the thus obtained composition were determined by the procedures according to JIS (Japanese Industrial Standard) K6301. As to the crosslinkability, determination was made by the aid of a JSR Curastometer (manufactured by Japan Synthetic Rubber Co., Ltd.) under the following conditions: mold chamber, No. 1; frequency, 6 cpm; amplitude, +3°; temperature, 160° C.

The results are shown in Table 1, from which the following facts are understood:

(1) In Comparative Example 2 and Examples 6 and 7, the blend compositions show good crosslinkability and excellent strength and elongation after aging with heat. In Comparative Example 2, carbon black showing a large reinforcing property was employed in an amount of 50 parts, while in Examples 6 and 7, the amounts of carbon black used were 30 parts and 15 parts, respectively;

(2) In Comparative Example 3 and Examples 3 and 8, the mechanical strength both under normal conditions and after aging with heat is greatly improved by the fluoroelastomer like CHC;

(3) In Comparative Example 4 and Example 5 and 9, the crosslinkability is improved, and the tensile strength or the elongation under normal conditions is excellent, a good balance being maintained. After aging with heat, a remarkable effect is observed in comparison with CHC and NBR.

effected. For overcoming such drawback, it has been proposed to use a processing agent or a plasticizer in order to make the resulting composition improved in rollability and reduced in adhesive property. However, such method affords a serious influence on the fluoroelastomer. Advantageously, the blend composition of this invention comprising the hydrocarbon elastomer can avoid the said drawback without affording any serious influence on the fluoroelastomer. This advantageous feature of the present invention may be understood from the composition of Examples 10 and 11 with Comparative Examples 5 and 6 as shown in Table 2.

TABLE 2

|  | Example | | Comparative Example | |
|---|---|---|---|---|
|  | 10 | 11 | 5 | 6 |
| Components of composition (parts by weight) | | | | |
| Iodine-containing fluoroelastomer | 90 | 75 | 96 | 90 |
| Nipol DN 202 | 10 | 25 | — | — |
| SRF Carbon black | 15 | 15 | 15 | 15 |
| Peroxymon F-40 | 5 | 5 | 5 | 5 |
| Triallyl isocyanurate | 4 | 4 | 4 | 10 |

TABLE 1

|  | Example | | | | | | | | | Comparative Example | | | |
|---|---|---|---|---|---|---|---|---|---|---|---|---|---|
|  | 1 | 2 | 3 | 4 | 5 | 6 | 7 | 8 | 9 | 1 | 2 | 3 | 4 |
| Components of composition (parts by weight) | | | | | | | | | | | | | |
| Fluoroelastomer[*1] | 65 | 65 | 65 | 65 | 65 | 59 | 50 | 65 | 65 | 100 | | | |
| Hydrocarbon rubber[*2] | NR | SBR | NBR | BR | EPDM | CHC | CHC | NBR | EPDM | | CHC | NBR | EPDM |
|  | 35 | 35 | 35 | 35 | 35 | 41 | 50 | 35 | 35 | | 100 | 100 | 100 |
| Carbon black[*3] | SRF | SRF | SRF | SRF | SRF | SRF | SRF | SRF | SRF | SRF | SRF | SRF | SRF |
|  | 30 | 30 | 30 | 30 | 30 | 30 | 15 | 15 | 1 | 30 | 50 | 15 | 2 |
| Activator CR[*4] | 6 | 6 | 6 | 6 | 6 | 6 | 6 | 6 | 1 | 6 | 6 | 6 | |
| Metal oxide[*5] | | | | | | | Pb$_3$O$_4$ | | MgO | | | | |
|  | | | | | | | 5 | | 3 | | | | |
| Peroxymon F-40[*6] | 4 | 4 | 4 | 4 | 4 | 4 | 5 | 2.5 | 5 | 2.5 | 5 | 2.5 | 5 |
| Another (triallyl isocyanurate) | | | | | | | 5 | | 1.5 | 4 | 5 | | 3 |
| Crosslinkability (determined by JSR Type Curastometer (manufactured by Japan Synthetic Rubber Co., Ltd.)/ Mold Chamber No. 1; Frequency, 6 cpm, ± 6°; 150° C. 30 minutes) | | | | | | | | | | | | | |
| Minimum viscosity (kg) | 0.37 | 0.32 | 0.39 | 0.54 | 0.275 | 0.29 | 0.14 | 0.40 | 0.27 | 0.28 | 0.20 | 0.38 | 0.24 |
| Degree of vulcanization (kg) | 1.77 | 2.93 | 2.50 | 4.22 | 1.44 | 3.13 | 2.64 | 2.05 | 1.88 | 4.93 | 2.20 | 3.22 | 1.20 |
| Induction time (min.) | 3.5 | 3.2 | 2.3 | 2.0 | 3.3 | 2.2 | 2.4 | 1.2 | 2.7 | 3.4 | 4.5 | 1.8 | 3.9 |
| Optimum vulcanizing time (min.) | 24.8 | 25.7 | 23.8 | 25.3 | 24.2 | 25.2 | 23.5 | 17.0 | 21.5 | 13.1 | 21.0 | 17.3 | 25.5 |
| Condition | 150° C. × 30 min., pressure-giving, 2 mm sheet | | | | | | Oven 150° C. × 3 hr. | 160° C. × 30 min. | 150° C. × 30 min. | 160° C. × 30 min. | 160° C. × 30 min. | 160° C. × 30 min. | 150° C. × 30 min. |
| 100% Stretching stress (kg/cm$^2$) | 55 | — | 119 | — | 61 | — | 57 | 52 | 9 | 55 | 47 | 22 | 7 |
| Tensile strength (kg/cm$^2$) | 115 | 138 | 170 | 174 | 122 | 130 | 110 | 144 | 88 | 235 | 103 | 68 | 15 |
| Elongation (%) | 220 | 70 | 150 | 50 | 190 | 90 | 250 | 200 | 430 | 340 | 260 | 220 | 290 |
| Hardness (JIS, Hs) | 72 | 84 | 78 | 89 | 74 | 81 | 76 | 72 | 63 | 81 | 74 | 64 | 53 |
| Aging test under heating | | | | | | | | | | | | | |
| Condition | 120° C. × 72 hrs. | | | | | | 100° C. × 70 hrs. | 100° C. × 70 hrs. | 150° C. × 6 hrs. | 100° C. × 70 hrs. | 100° C. × 70 hrs. | 100° C. × 70 hrs. | 150° C. × 6 hrs. |
| Tensile strength (kg/cm$^2$) | 56 | 81 | 191 | 161 | 113 | 135 | 106 | 151 | 109 | 242 | 102 | 82 | 22 |
| Elongation (%) | 190 | — | 90 | 30 | 130 | 80 | 230 | 140 | 260 | 290 | 160 | 230 | 70 |
| Hardness (JIS, Hs) | 73 | 94 | 87 | 95 | 77 | 86 | 77 | 75 | 68 | 83 | 81 | 66 | 62 |

Note:
[*1]In Examples 1 to 8 and Comparative Examples 1 to 3, fluoroelastomer obtained in Reference Example 1 was used. In Example 9 and comparative Example 4, fluoroelastomer obtained in Reference Example 2 was used.
[*2]NR, RSS No. 3; SBR, Nipol 1006 (manufactured by Nippon Zeon Co., Ltd.); NBR, Nipol DN 202 (manufactured by Nippon Zeon Co., Ltd.); BR, Nipol 1220 (manufactured by Nippon Zeon Co., Ltd.); EPDM, Esprene 505 (manufactured by Sumitomo Chemical Co., Ltd.); CHC, Hercula 200 (manufactured by Hercules Inc.); EPDM used in Example 9 and Comparative Example 4, Royalen X-305 (manufactured by Uniroyal, Inc.), ML$_{1+4}$ (100° C.), 60.
[*3]"Seast S" manufactured by Tokai Carbon Co., Ltd.
[*4]Ca(OH)$_2$ manufactured by Bayer A.G.
[*5]MgO No. 150, manufactured by Kyowa Chemical Co., Ltd.
[*6]"Peroxymon F-40" manufactured by Nippon Oil & Fats Co., Ltd.

In conventional fluoroelastomers or iodine-containing fluoroelastomers, heat generation is encountered during the roll-processing procedure, which produces an adhesion problem at the roll. Therefore, the thickness of the elastomer in the roll-processing procedure can not be made small unless sufficient water-cooling is Workability during rolling (roll, 8 × 20 inch; Ni/Cr plating; water-cooling; rotational ratio, 18 × 24 rpm)

| Appearance of composition by portioning on 0.5 mm roll | Good | Excellent | Bad | Bad (miscibility being bad) |
|---|---|---|---|---|

TABLE 2-continued

| | Example | | Comparative Example | |
|---|---|---|---|---|
| | 10 | 11 | 5 | 6 |
| Adhesion | None | None | Observed | None |
| Contraction after portioning | Small | Small | Large | Middle |
| Time required | Normal | Normal | Normal | Too long |

Another advantageous property of the blend composition of the invention is excellent oil-resistance. As already mentioned, the fluoroelastomer is superior in oil-resistance, especially in fuel oil-resistance, while the hydrocarbon elastomer has an economical advantage. By their combined use, the demerits of the two elastomers are covered up by each other. Among the hydrocarbon elastomers, epichlorohydrin rubber and butadiene-acrylonitrile rubber are known to be excellent in oil-resistance. When these rubbers are employed as parts of fuel oil systems in aeroplanes, motorcars and ships, the thermal resistance, the oxidation resistance and the flexibility at low temperature which are maintained stably for a long time are required.

Table 3 shows the results of comparative investigation of the oil-resistance, especially against fuel oil, of conventional fluoroelastomers and iodine-containing fluoroelastomers.

TABLE 3

| | Example | | | | Comparative Example | | | | | |
|---|---|---|---|---|---|---|---|---|---|---|
| | 12 | 13 | 14 | 15 | 7 | 8 | 9 | 10 | 11 | 12 |
| Components of composition (parts by weight) | | | | | | | | | | |
| Conventional fluoroelastomer[*1] | — | — | — | — | 100 | — | — | 100 | — | 65 |
| Fluoroelastomer of invention | 50 | 65 | 50 | 100 | — | — | — | — | — | — |
| Nipol DN 202 | — | 35 | 50 | — | — | 100 | — | — | 100 | 35 |
| Hercula 200 | 50 | — | — | — | — | — | 100 | — | — | — |
| SRF Carbon black | 15 | 27 | 32 | 30 | 30 | 15 | 50 | 15 | 30 | 27 |
| Activator CF | 6 | 6 | 6 | 6 | 6 | 6 | 6 | — | 6 | — |
| Peroxymon F-40 | 5 | 5 | 5 | 2.5 | 5 | 2.5 | 5 | — | — | — |
| Triallyl isocyanurate | 5 | 5 | 5 | 4 | 5 | 4 | 5 | — | — | — |
| Metal oxide | Pb$_3$O$_4$ 5 | — | — | — | — | — | — | MgO, 3 ZnO, 5 | ZnO, 5 | MgO, 3.7 ZnO, 5 |
| Crosslinking agent[*2] | — | — | — | — | — | — | — | Sulfur, 2 | Sulfur, 0.6; TT, 2.0 | Sulfur, 1.65 TT, 0.70 |
| Accelerator | — | — | — | — | — | — | — | Triethylenediamine, 1.0 | Cz, 1.0 | Triethylenediamine, 1.0 |
| Stearic acid | — | — | — | — | — | — | — | 1.0 | — | 1.0 |
| Crosslinkability | | | | | | | | (150° C.) | (150° C.) | |
| Minimum viscosity (kg) | 0.14 | 0.16 | 0.15 | 0.28 | 0.45 | 0.37 | 0.20 | 0.15 | 0.20 | 0.18 |
| Degree of vulcanization (kg) | 2.64 | 3.28 | 2.75 | 4.93 | 0.65 | 3.01 | 2.20 | 0.40 | 1.71 | 0.95 |
| $T_{10}$ | 2.4 | 1.8 | 2.0 | 3.4 | — | 1.4 | 4.5 | — | 2.4 | 2.3 |
| $T_{90}$ | 23.5 | 13.0 | 20.5 | 13.1 | — | 14.8 | 21.0 | — | 8.4 | 10.5 |
| Press cure (°C. × min.) | 160×30 | 160×30 | 160×30 | 160×30 | 160×30 | 160×30 | 160×30 | 160×30 | 150×30 | 150×30 |
| Oven cure (°C. × hr.) | 150×3 | — | — | — | — | 150×3 | — | — | — | — |
| Normal condition | | | | | | | | | | |
| 100% Stretching stress (kg/cm$^2$) | 57 | 80 | 63 | 55 | Bubbled; production of test piece impossible | 22 | 64 | Bubbled; production of test piece impossible | 16 | Bubbled; production of test piece impossible |
| Tensile strength (kg/cm$^2$) | 110 | 160 | 167 | 235 | | 68 | 103 | | 155 | |
| Elongation (%) | 250 | 200 | 230 | 340 | | 220 | 260 | | 640 | |
| Hardness (JIS, Hs) | 76 | 66 | 69 | 81 | | 64 | 74 | | 65 | |
| Physical properties after heat treatment (100° C. × 70 hrs.) | | | | | | | | | | |
| $M_{100}$ | 66 | 132 | 107 | 66 | | 25 | 71 | | 21 | |
| $T_B$ | 106 | 174 | 174 | 242 | | 80 | 102 | | 135 | |
| $E_B$ | 230 | 150 | 150 | 290 | | 220 | 160 | | 500 | |
| Hardness (JIS, Hs) | 77 | 85 | 82 | 83 | | 66 | | | 57 | |
| Oil resistance[*3] (determined after immersing at 80° C. for 24 hours in regular gasoline (manufactured by Maruzen Oil Co., Ltd.; 1 wt % of lauroyl peroxide incorporated)) | | | | | | | | | | |
| $M_{100}$ | 45 | 84 | 54 | — | — | — | — | — | 10 | — |
| $T_B$ | 82 | 110 | 112 | 172 | — | 17 | 38 | — | 40 | — |
| $E_B$ | 180 | 130 | 170 | 240 | — | 80 | 80 | — | 400 | — |
| Hardness (JIS, Hs) | 65 | 69 | 70 | 67 | — | 61 | 60 | — | 50 | — |

TABLE 3-continued

| | Example | | | | Comparative Example | | | | | |
|---|---|---|---|---|---|---|---|---|---|---|
| | 12 | 13 | 14 | 15 | 7 | 8 | 9 | 10 | 11 | 12 |
| ΔV (%) | +16.9 | +17.4 | +20.9 | +7.2 | — | +44.4 | +34.3 | +37.5 | | |

Note:
*¹VdF/HFP copolymer (78:22 in molar ratio), ML$_{1+10}$ (140° C.) 28, [η] 0.68.
*²TT, Soxinol TT manufactured by Sumitomo Chemical Co., Ltd., tetramethylthiuram disulfide.
*³ΔV indicates a volume swelling rate (%).

From the results shown in Table 3, it is understood that the volume swelling rates of the vulcanized rubbers in Examples 12 to 15 are much smaller than those in Comparative Examples 7 to 12. As to the non-co-crosslinking system, the preparation of specimens cannot be effected. The additive value is inferior to the conventional values usually adopted and to the calculated values obtained from individual values of ΔV in the Examples of the invention and the Comparative Examples. Thus, it is thought that the co-crosslinking system exhibits its strong point sufficiently.

What is claimed is:

1. A co-crosslinkable blend composition which comprises a fluoroelastomer comprising units of vinylidene fluoride and at least one other copolymerizable fluoroolefin having iodine bonded thereto in an amount of 0.001 to 10% by weight, an elastomer crosslinkable in the presence of a peroxy radical, and an organic peroxide, the amount of elastomer being from 5 to 100 parts by weight with respect to 100 parts by weight of the iodine-containing fluoroelastomer.

2. The blend composition according to claim 1, wherein said blend includes a crosslinking or co-crosslinking compound having a polyaryl group or a polyvinyl group which is reactive with both peroxy radicals and the polymeric radicals in the blend.

3. The blend composition according to claim 2, wherein the crosslinking or co-crosslinking compound is selected from the group consisting of diallyl phthalate, triallyl cyanurate, triallyl isocyanurate, triacrylformal, triallyl trimellitate, N,N'-m-phenylenebismaleimide, dipropargyl terephthalate, divinylbenzene, divinylspirodioxane, tetraallyloxyethane, tetraallyl terephthalamide and divinylsilane.

4. The crosslinked polymer product obtained by subjecting the blend composition of claim 1 to vulcanization.

5. The blend composition according to claim 1, wherein copolymerizable fluoroolefin is tetrafluoroethylene, chlorotrifluoroethylene, trifluoroethylene, vinyl fluoride, hexafluoropropylene, pentafluoropropylene, perfluoro(methyl vinyl ether), perfluoro(ethyl vinyl ether) and perfluoro(propyl vinyl ether).

6. The blend composition according to claim 1, wherein the elastomer is natural rubber, synthetic natural rubber, ethylene-propylene rubber, ethylene-propylene diene monomer rubber, butadiene-styrene rubber, butadiene rubber, halogenated butyl rubber, chloroprene rubber, isobutylene-isoprene rubber, butadiene-acrylonitrile rubber, chlorosulfonated polyethylene rubber, acrylic rubber, epichlorohydrin rubber, epichlorohydrin-ethylene oxide rubber or urethane rubber.

7. The blend composition according to claim 1, wherein said blend includes a divalent metal oxide or a divalent metal hydride as an additional component.

* * * * *